Patented July 19, 1949

2,476,891

UNITED STATES PATENT OFFICE 2,476,891

MIXED ESTERS OF POLYHYDRIC ALCOHOLS WITH MERCAPTOCARBOXYLIC AND DRYING OIL ACIDS

Carl Walter Mortenson, Wilmington, Del., assignor to E. I. du Pont de Nemours & Company, Wilmington, Del., a corporation of Delaware No Drawing. Application January 19, 1944, Serial No. 518,885

7 Claims. (Cl. 260—399)

This invention relates to polyhydric alcohol mixed esters.

This invention has as an object the provision of new compositions comprising esters of mercaptocarboxylic acids in combination with other carboxylic acids, said esters being identical in drying properties and composition with the products obtained by reacting an esterifiable mercaptocarboxylic compound with a polyhydric alcohol partial ester of an unsaturated monocarboxylic acid which is free of mercapto substituents. A further object is the provision of new polyhydric alcohol mixed esters comprising esters of short chain aliphatic mercaptocarboxylic acids in combination with fatty oil acids, said esters being identical in drying properties and composition with the products obtained by reacting a short chain aliphatic mercaptocarboxylic acid with a polyhydric alcohol partially acylated with a drying oil acid compound. Another object is the provision of methods for preparing the said new polyhydric alcohol mixed esters. Other objects will appear hereinafter.

This invention has as an object the provision of new esters. Another object is the provision of new film forming materials. A further object is the provision of new coating compositions. Other objects will appear hereinafter.

These objects are accomplished by the following invention of polyhydric alcohol mixed esters of mercaptocarboxylic acids and non-mercapto monocarboxylic acids and the preparation thereof by esterification of a polyhydric alcohol with a monocarboxylic acid free from mercapto groups and with a mercaptocarboxylic acid.

In one method of practicing this invention, a polyhydric alcohol partial ester of a monocarboxylic acid free of mercapto substituents is reacted with an amount of an esterifiable mercaptocarboxylic compound required to yield a substantially neutral ester. Thus, for example, a mixed glyceride of mercaptoacetic acid and linseed oil acids is readily obtained by alcoholizing linseed oil with glycerol in the presence of litharge at 225° C., for about an hour and a half and then esterifying the resulting product with mercaptoacetic acid at approximately 160° C. for seven hours. The resulting mixed glyceride when exposed to air in a thin film in the presence of about 0.1% of a suitable metallic drier and 0.15% of a diacyl peroxide becomes dust-free in one to two hours and is completely tack-free and hard after overnight drying at room temperature. Upon baking at 100° C. hard films are obtained with only the metallic drier to catalyze the drying of the composition.

In the preparation of the polyhydric alcohol mixed esters of this invention, it is generally desirable to maintain an inert atmosphere during both stages of the reaction, for example, by slowly bubbling carbon dioxide through the reaction mixture. Water formed during the second stage of the reaction is conveniently removed by means of a low boiling hydrocarbon solvent, from which the water is readily removed by an ordinary separator, and the solvent returned to the reaction mixture. The solvent used in the reaction mixture may then be removed by bubbling an inert gas through the polyhydric alcohol mixed ester.

The more detailed practice of the invention is illustrated by the following examples, wherein parts given are by weight. There are, of course, many forms of the invention other than these specific embodiments.

Example I

A mixture of 28.6 parts (2.6 parts excess) of mercaptoacetic acid and 50 parts of linseed oil monoglyceride (prepared by reacting 1756 parts of linseed oil and 372 parts of glycerol in the presence of 1.8 parts of litharge at 225° C. for 1.5 hours), 0.3 part sodium hydrogen sulfate as catalyst, and 15 parts of xylene as a water carrier was heated at 100° C. for two hours in a reactor fitted with a stirrer, gas inlet tube for inert gas, a thermometer, and a reflux condenser equipped with a take-off tube to permit the removal of water as it is formed and the return of solvent to the reaction mixture. A current of carbon dioxide was passed through the reaction mixture and the reaction mixture was then heated in the carbon dioxide atmosphere to 150° C. and maintained at that temperature until all the water was removed. Upon removal of the xylene, a liquid, light yellow product was obtained. With 0.03% iron, as iron linoleate, this product dried tack-free rapidly to give a hard, slightly wrinkled film. With 0.1% of iron, added as iron linoleate, and about 0.1% of benzoyl peroxide the film dried rapidly in air. A film was completely tack-free and hard after one hour at 100° C. in contact with air.

The above composition is a polyhydric alcohol mixed ester containing 41.6% mercaptoacetic acid glyceride and 58.4% linseed oil acids glyceride.

Example II

A mixture of 118 parts of linseed oil monoglyceride, 92.5 parts of linseed oil diglyceride, and 75.5 parts of mercaptoacetic acid was reacted as described in Example I at 155° C. to 160° C. for seven hours. The solvent was removed by blowing carbon dioxide through the reaction mixture for 25 minutes, and the reaction mixture was then cooled and filtered. The resulting polyhydric alcohol mixed glyceride had a color of 3.7, as measured on the Gardner-Holdt scale, and a viscosity of 1.25 poises. With 0.05% iron, as iron linoleate, as drier and 0.15% benzoyl peroxide, the polyhydric alcohol mixed ester dried dust-free in one to two hours in air and films were tack-free and hard after overnight drying in air. With 0.01% iron alone, the polyhydric alcohol mixed glyceride gave tough, tack-free films upon baking in air at 100° C. for one hour.

The above polyhydric alcohol mixed glyceride corresponds in composition to 30% mercaptoacetic glyceride and 70% linseed oil acid glyceride.

Example III

A mixture of 184.8 parts of linseed oil diglyceride and 27.6 parts of mercaptoacetic acid was reacted as in Example I at 150° to 160° C. for seven hours. After removal of the solvent the polyhydric alcohol mixed ester was blown with carbon dioxide for 25 minutes, cooled, and filtered, giving an oil with a color of 3.7, as measured on the Gardner-Holdt scale, and a viscosity of 0.65 poise. With 0.05% iron, as iron linoleate, and 0.15% benzoyl peroxide, hard, tough films were obtained upon baking in air at 100° C. for one hour.

In place of the glycerol in the above examples, other monomeric polyhydric alcohols can be used in the preparation of the polyhydric alcohol mixed esters of this invention. Examples of such alcohols include ethylene glycol, propylene glycol, hexamethylene glycol, decamethylene glycol, diethylene glycol, sorbitol, cyclohexyl-1,2-dicarbinol, methyltrimethylolmethane, p,p' - bis(2-hydroxyethyl)benzene, and the like.

The mercaptocarboxylic acids may contain one or more mercapto groups and may be present in any relative amount in comparison with the drying oil acid component of the ester, although it is generally desirable that the drying oil acids glyceride represent about 40% (by weight) or more of the total glyceride content of the composition, when only monobasic acids containing only one mercapto gorup, and no other acids aside from the drying oil acids, are used. The mercapto acids may be mono- or polycarboxylic and may be substituted or not, provided such substituent groups do not interfere with the drying characteristics of the resulting polyhydric alcohol mixed esters.

These acids may also be saturated or unsaturated and may be aliphatic or may contain carbocyclic or heterocyclic groups. Examples of suitable mercapto acids in addition to mercaptoacetic include mercaptopropionic, mercaptovaleric, mercaptodecanoic, mercaptocaproic, mercaptosuccinic, mercaptoadipic, mercaptosebacic, mercaptooleic, mercaptostearic, mercaptocrotonic, ortho-mercaptocinnamic, alphamercaptodiphenylacetic, 2-mercaptonicotinic, 3-mercaptopicolinic, 3-mercapto-o-toluic, and the like.

Examples of suitable unsaturated monocarboxylic acids are linoleic acid, linolenic acid, beta-eleostearic acid, oleic acid, hexenoic acid, crotonic acid, decenoic acid, beta-(2-furyl)acrylic acid, sorbic acid, cyanosorbic acid, cinnamylacetic acid, cinnamic acid, pyridine-beta-carboxylic acid, pyridine-alpha-carboxylic acid, etc. Particularly preferred for the non-mercapto carboxylic acids are the drying oil acids, i. e., the mixture of acids combined with glycerol in a drying oil.

The examples have illustrated the preparation of the polyhydric alcohol mixed esters by reacting the mercapto carboxylic acid with the partial ester of a polyhydric alcohol and a carboxylic acid free of mercapto groups. These esters can also be made either by reacting a polyhydric alcohol partial ester of the mercapto carboxylic acid with the carboxylic acid free of mercapto groups, or by direct reaction of the mercapto acid, a natural oil, and a polyhydric alcohol.

In addition to the mercaptocarboxylic acid and the non-mercapto unsaturated monocarboxylic acid there can also be present non-mercapto saturated monocarboxylic acids, if it is desired to modify the drying properties of the resulting esters. Examples of suitable non-mercapto saturated monocarboxylic acids are butyric, hexanoic, decanoic, stearic, and the like.

The polyhydric alcohol mixed esters of this invention can be made either in an open vessel or in a closed reactor in the presence or absence of a solvent, e. g., benzene, toluene, xylene, gasoline, etc.

To the compositions of this invention can be added bodied or raw drying or semi-drying oils, gums, e. g., rosin, damar, kauri, ester gum, etc., and the resulting compositions can be compounded with dyes, pigments, fillers and the like.

The compositions of this invention may also be blended with such materials as nitrocellulose, organic cellulose ethers, polyacrylates and methacrylates, and other vinyl and vinylidene polymers, amide-formaldehyde and aldehyde-ketone resins, and oil soluble phenol-formaldehyde resins.

In place of iron linoleate there may be added as a drier other iron salts of drying oil acids commonly used as varnish and paint driers, e. g., the iron salts of oleic acid, China-wood oil acids, etc., as well as iron rosinate.

The compositions of this invention are useful alone and in admixture with drying oils, natural and synthetic gums, cellulose derivatives, etc., as coating compositions, as binders for pigments and fillers, as plasticizers, etc.

The above description and examples are intended to be illustrative only. Any modification of or variation therefrom which conforms to the spirit of the invention is intended to be included within the scope of the claims.

What is claimed is:

1. An ester of a polyhydric alcohol having all of the hydroxyl groups thereof esterified by a mixture of acids, one of which is a mercaptocarboxylic acid, the remaining acids being those of a drying oil.

2. An ester of a polyhydric alcohol having all of the hydroxyl groups thereof esterified by a mixture of acids, one of which is mercaptoacetic acid, the remaining acids being those of a drying oil.

3. An ester of a polyhydric alcohol having all of the hydroxyl groups thereof esterified by a mixture of acids, one of which is mercaptoacetic acid, the remaining acids being linseed oil acids.

4. A synthetic drying oil consisting of an ester of glycerol having all the glycerol hydroxyls esterified by a mixture of acids, one of which is a mercaptomonocarboxylic acid and the remainder of which are drying oil acids.

5. An ester of glycerol having all its hydroxyls esterified by mercaptoacetic acid and linseed oil acids.

6. A polyhydric alcohol ester having all the hydroxyls of said polyhydric alcohol esterified by a mixture of acids one of which is a short chain mercaptocarboxylic acid, the remaining acids being those of a drying oil.

7. A glyceride having all of the hydroxyls of the glycerol esterified by a mixture of acids one of which is a short chain mercaptocarboxylic acid, the remaining acids being those of a drying oil.

CARL WALTER MORTENSON.

REFERENCES CITED

The following references are of record in the file of this patent:

UNITED STATES PATENTS

| Number | Name | Date |
|---|---|---|
| 1,558,299 | Schwartz | Oct. 20, 1925 |
| 2,145,443 | Harris | Jan. 31, 1939 |
| 2,166,144 | Harris | July 18, 1939 |
| 2,257,750 | Lincoln | Oct. 7, 1941 |
| 2,268,185 | Burke et al. | Dec. 30, 1941 |